(12) United States Patent
Jensen et al.

(10) Patent No.: US 12,490,754 B2
(45) Date of Patent: Dec. 9, 2025

(54) WHEY PROTEIN-BASED, HIGH PROTEIN, YOGHURT-LIKE PRODUCT, INGREDIENT SUITABLE FOR ITS PRODUCTION, AND METHOD OF PRODUCTION

(71) Applicant: ARLA FOODS AMBA, Viby J (DK)

(72) Inventors: Torben Jensen, Viby J (DK); Ulrik Hansen, Viby J (DK)

(73) Assignee: ARLA FOODS AMBA, Viby J (DK)

( * ) Notice: Subject to any disclaimer, the term of this patent is extended or adjusted under 35 U.S.C. 154(b) by 1123 days.

(21) Appl. No.: 15/525,512

(22) PCT Filed: Nov. 16, 2015

(86) PCT No.: PCT/EP2015/076703
§ 371 (c)(1),
(2) Date: May 9, 2017

(87) PCT Pub. No.: WO2016/075332
PCT Pub. Date: May 19, 2016

(65) Prior Publication Data
US 2017/0318828 A1  Nov. 9, 2017

(30) Foreign Application Priority Data

Nov. 14, 2014  (EP) ..................... 14193363

(51) Int. Cl.
| | | |
|---|---|---|
| A23C 21/06 | (2025.01) | |
| A23C 21/02 | (2025.01) | |
| A23J 1/20 | (2006.01) | |
| A23J 3/08 | (2006.01) | |
| A23L 33/19 | (2016.01) | |

(52) U.S. Cl.
CPC .............. *A23C 21/06* (2013.01); *A23C 21/02* (2013.01); *A23C 21/026* (2013.01); *A23J 1/205* (2013.01); *A23J 3/08* (2013.01); *A23L 33/19* (2016.08); *A23V 2002/00* (2013.01)

(58) Field of Classification Search
CPC ......... A23C 21/06; A23C 21/02; A23L 33/19; A23J 1/205; A23J 3/08
USPC ....................................................... 426/583
See application file for complete search history.

(56) References Cited

U.S. PATENT DOCUMENTS

| | | |
|---|---|---|
| 5,217,741 A | 6/1993 | Kawachi et al. |
| 5,882,705 A | 3/1999 | Sato et al. |
| 6,605,311 B2 | 8/2003 | Villagran et al. |
| 2002/0039617 A1 | 4/2002 | Villagran et al. |
| 2008/0305235 A1 | 12/2008 | Gao et al. |
| 2012/0114795 A1* | 5/2012 | Havea ............... A23C 9/1307 426/41 |

FOREIGN PATENT DOCUMENTS

| | | |
|---|---|---|
| CA | 1182682 | 2/1985 |
| CN | 1678199 | 10/2005 |
| CN | 102550669 | 7/2012 |
| DE | 19950240 | 5/2001 |
| DE | 102012216990 | 3/2013 |
| EP | 0250623 | 1/1988 |
| EP | 0485663 | 5/1992 |
| EP | 1589821 | 5/2007 |
| EP | 1839492 A1 | 10/2007 |
| EP | 2351489 | 8/2011 |
| EP | 1839492 | 9/2011 |
| EP | 2486803 | 8/2015 |
| EP | 3217801 | 9/2017 |
| JP | 2004344042 A1 | 12/2004 |
| JP | 2005013212 A | 1/2005 |
| JP | 2008-514667 | 5/2008 |
| JP | 2010-517515 | 5/2010 |
| JP | 2014-511176 | 5/2014 |
| WO | WO 93/00832 | 1/1993 |
| WO | WO 97/37548 | 10/1997 |
| WO | WO 99/38389 | 8/1999 |
| WO | 01/97629 | 12/2001 |
| WO | WO 01/97629 A2 | 12/2001 |
| WO | WO 04/071203 | 2/2004 |
| WO | WO 2004/030464 | 4/2004 |
| WO | WO 2005/041677 | 5/2005 |
| WO | WO 2006/034857 | 4/2006 |
| WO | WO 2006/068521 | 6/2006 |
| WO | 2007/110411 | 10/2007 |
| WO | 2008/063115 | 5/2008 |
| WO | WO 2008/092458 A1 | 8/2008 |
| WO | WO 2010/047230 | 4/2010 |

(Continued)

OTHER PUBLICATIONS

European Extended Search Report for Application No. 14193363.0 dated Apr. 22, 2015 (4 pages).
International Search Report and Written Opinion for Application No. PCT/EP2015/076703 dated Jan. 18, 2016 (13 pages).
Annigje Dentener Delaration dated Jun. 22, 2020, 11 pages.
Anny Dentener-Boswell—Food and Dairy Technology Consultant, exhibit AD-1 referred to in the declaration of Annigje Dentener made on Jun. 22, 2020, 4 pages.
Britten et al., "Acid-induced gelation of whey protein polymers: effects of pH and calcium concentration during polymerization." Food Hydrocolloids 2001, 15: 609-617.

(Continued)

*Primary Examiner* — Jeffrey P Mornhinweg
(74) *Attorney, Agent, or Firm* — Lisa Mueller; Tristan A. Fuierer; Casimir Jones

(57) ABSTRACT

The present invention pertains to a new type of food ingredient containing a combination of insoluble whey protein particles having a particle size in the range of 1-10 micron (referred to as type A particles) and acid-gellable whey protein aggregates (referred to as type B particles). The invention furthermore pertains to whey protein-based, yoghurt-like products containing the combination of type A and type B particles and to methods of producing the food ingredient and the whey protein-based, yoghurt-like products.

8 Claims, 4 Drawing Sheets

(56) References Cited

FOREIGN PATENT DOCUMENTS

| WO | 2010/120199 | 10/2010 |
|---|---|---|
| WO | 2010120199 A1 | 10/2010 |
| WO | 2011/015443 | 2/2011 |
| WO | WO 2012/0081892 | 6/2012 |
| WO | WO 2012/081982 | 6/2012 |
| WO | WO 2012/110705 | 8/2012 |
| WO | WO 2013/065014 A1 | 5/2013 |
| WO | WO 2015/059243 | 4/2015 |
| WO | 2016075332 A1 | 5/2016 |
| WO | WO 2018/011392 | 1/2018 |

OTHER PUBLICATIONS

Calculation of the amount of total protein, casein and whey protein in the yoghurt described in Example 2 of D1, 1 page.
Curriculum Vitae, Exhibit EF-1 Foegeding Declaration made on Jun. 20, 2020, 59 pages.
Declaration of Edward Allen Foegeding dated Jun. 20, 2020, 19 pages.
Description on how the sources of type A and type B particles used in Examples 2 and 3 of International Patent Application No. PCT/EP2017/067829, 1 page.
Donato et al., "Mechanism of formation of stable heat-induced b-lactoglobulin microgels." International Dairy Journal 19 (2009) 295-306.
Elofsson, "Characterization of a cold-gelling whey protein concentrate." Int. Dairy Journal August-Sep. 1997, 7(8-9): 601-608.
Expert Evidence practice notes—to Dentener Declaration, Exhibit AD-2 in declaration of Annigje Dentener made on Jun. 22, 2020, 14 pages.
Expert Evidence practice notes—to Foegeding Declaration, Exhibit EF-2 in declaration of Edward Allen Foegeding made on Jun. 22, 2020, 14 pages.
Food Standards—Standard 2.5.3 Fermented Milk products, Mar. 25, 2015, 2 pages.
Kosikowski et al., Cheese and Fermented Milk Foods, Origins and Principles. Volume 1, 3rd Edition, 1999; Chapter 3 "Cultures and Starters"; Chapter 6 "Yogurt"; 10 pages.
Langton et al. "Fine-stranded and particulate gels of beta-lactoglobulin and whey protein at varying pH" Food Hydrocolloids 1992, 5(6):523-539.
Nicolai et al., "Beta-Lactoglobulin and WPI aggregates: Formation, structure and applications." Food Hydrocolloids 2011, 25:1945-1962.
Nicolai et al., "Controlled food protein aggregation for new functionality." Curr Opin in Colloid & Interface Science 2013, 18:249-256.
Notice of Opposition filed Feb. 17, 2020 by Fonterra Co-operative Group Limited, European Patent No. 3217801, 28 pages.
Rabiey & Britten, "Effect of protein composition on the rheological properties of acid-induced whey protein gels." Food Hydrocolloids 2009, 23:973-979.
Reply to Opposition against European Patent No. 3217801, filed Jul. 10, 2020 by Applicant, 10 pages.
Saglam, "Design and Functionality of Dense Protein Particles." Ph.D thesis, Wageningen University, Wageningen, NL, published Nov. 16, 2012, 208 pages.
Schenkel et al., "The effect of adding whey protein particles as inert filler on thermophysical properties of fat-reduced semi hard cheese type Gouda." International Journal of Dairy Technology 2013, 66(2): 220-230.
Schmitt et al., "Influence of protein and mineral composition on the formation of whey protein heat-induced microgels." Food Hydrocolloids 25 (2011) 558-567.
Second Annigje Dentener Delaration dated Jul. 7, 2020, 10 pages.
Second Edward Allen Foegeding Declaration dated Jul. 2, 2020, 22 pages.
Singer et al. "Protein Micropartiulation: The Principle and the Process." Journal of the Americal College of Nutrition 1990, 9(4):388-397.
Statement of Grounds of Particulars filed in Opposition against AU 2015344999 dated Mar. 23, 2020, 19 pages.
Study of heat induced gelation properties of Type B particles, 2 pages.
Summons to Attend Oral Proceedings dated Nov. 11, 2020, European Application No. 15797639.0.
Opposition—Statement of Grounds and Particulars dated Jan. 5, 2021, Australian Application No. 2015344999.
Declaration of Milena Corredig dated Oct. 10, 2020, In the Matter of: Australian Patent Application No. 2015344999 and Opposition filed by Fonterra Co-Operative Group Limited.
Declaration of Richard Ipsen dated Sep. 30, 2020, In the Matter of: Australian Patent Application No. 2015344999 and Opposition filed by Fonterra Co-Operative Group Limited.
Brief Communication regarding Oral Proceedings for European pat. No. 3217801 dated Jun. 22, 2021, 17 pages.
Declaration of Annigje Dentener and Curriculum Vitae dated Apr. 30, 2020, 22 pages.
Declaration of Edward Allen Foegeding and Curriculum Vitae dated Apr. 31, 2021, 80 pages.
Information about the result of the opposition, from the oral proceedings for European application No. 15797639.0, dated Jul. 6, 2021, 1 page.
Interlocutory decision in Opposition proceedings, European Pat. No. 15797639.0, dated Sep. 14, 2021, 46 pages.
Van Reimsdijk et al., "Preparation of gluten-free bread using a meso-structured whey protein particle system" Journal of Cereal Science 53 (2011) 355-361.
GBassi et al. "Whey proteins analysis in aqueous medium," International Journal of Biological and Chemical Sciences, vol. 6, No. 4, Aug. 2012, pp. 1828-1837.
European Patent Office, "Notice of Opposition to a European Patent," for Patent No. EP3542635, Jul. 6, 2022.
Statement of Grounds of Appeal. p1903EP01. EP 3217801. Dated Jan. 20, 2022. 15 pages.
Barbut and Foegeding. Ca2+-Induced Gelation of Pre-heated Whey Protein Isolate. Journal of Food Science. 1993. vol. 58; No. 4. 867-871.
Donato et al., Mixtures of whey proteinmicrogels and soluble aggregates as building blocks to control rheology and structure of acid induced cold-set gels. Food Hydrocolloids. 2011. 25; 734-742.
Torres et al., Effect of microparticulated whey protein with varying content of denatured protein on the rheological and sensory characteristics of low-fat yoghurt. International Dairy Journal. 2011. 21;645-655.
Torres et al., Using fractal image analysis to characterize microstructure of low-fat stirred yoghurt manufactured with microparticulated whey protein. Journal of Food Engineering. 2012. 109:721-729.

* cited by examiner a)

b)

c)

WHEY PROTEIN-BASED, HIGH PROTEIN, YOGHURT-LIKE PRODUCT, INGREDIENT SUITABLE FOR ITS PRODUCTION, AND METHOD OF PRODUCTION

CROSS-REFERENCE TO RELATED APPLICATIONS

This is a U.S. national stage entry of International Patent Application No. PCT/EP2015/076703, filed on Nov. 16, 2015, which claims priority to European Patent Application No. 14193363.0, filed on Nov. 14, 2014, the entire contents of all of which are fully incorporated herein by reference.

FIELD OF THE INVENTION

The present invention pertains to a new type of food ingredient containing a combination of insoluble whey protein particles having a particle size in the range of 1-10 micron (referred to as type A particles) and acid-gellable whey protein aggregates (referred to as type B particles). The invention furthermore pertains to whey protein-based, yoghurt-like product containing the combination of type A and type B particles and to methods of producing the food ingredient and the whey protein-based, yoghurt-like product.

BACKGROUND

Whey protein is known to be a high quality protein source for human nutrition and is useful as a nutritional supplement for persons in need for extra protein, be it elderly malnourished people, athletes requiring protein for increased muscle build-up, or people wishing to lose weight by thermogenic effect of an increased relative amount of protein in the daily diet.

SUMMARY OF THE INVENTION

The present inventors have discovered that preparation of high protein, whey protein-based yoghurt products is challenging, and especially the production of stirred-type or set-type high protein, whey protein-based yoghurt products. The inventors have found that without significant amounts of casein, high concentrations of whey protein has a strong tendency to form gel during the heat-treatment step that is used in yoghurt processes.

If the gel formation is too strong, the heat-treatment equipment clogs up and the production has to be stopped and the equipment cleaned before the production can start again. Even if the heat-treatment equipment can be operated without immediately clogging up, the development of whey protein gel during the heating leads to shorter operation cycles of heating equipment between of cleaning cycles.

The development of whey protein gel during the heating step furthermore results in a reduction in the sensory quality of the resulting yoghurt-like product. The whey protein gel may be broken up by homogenisation prior to the acidification step, but once broken, no strong gel is formed during or after the acidification. The resulting product suffers from low viscosity, a watery consistency, a high level of sandiness and a high level of gel particle sedimentation.

The inventors found that these problems can be solved by using a combination of microparticulated whey protein particles (referred to as type A particles) and acid-gellable whey protein aggregates (referred to as type B particles) as protein source. The surprising effect of this solution is that the gel formation, and thus the viscosity build-up, during the heat-treatment step is significantly reduced. Furthermore, the type B particles seem to retain their ability to generate strong gels during the acidification (contrary to the broken gels of denatured native whey protein). The yoghurt-like product resulting from the present invention therefore has a desirable high viscosity and a strongly reduced tendency to sedimentation and syneresis, which makes it attractive for stirred-type or set-type yoghurt products.

Thus, an aspect of the invention pertains to a food ingredient which is suitable for the production of high protein, whey-protein based yoghurt-like products. The ingredient is a dry food ingredient comprising:

a total amount of protein of at least 30% (w/w), a combination of:

insoluble whey protein particles having a particle size in the range of 1-10 micron (referred to as type A particles) in an amount of at least 20% (w/w) relative to the total amount of protein, and acid-gellable whey protein aggregates having a particle size in the range of 0.02-0.5 micron referred to as type B particles in an amount of at least 10% (w/w) relative to the total amount of protein, optionally, carbohydrate, and optionally, fat and wherein at least 90% of the protein is whey protein.

Another aspect of the invention pertains to a method of producing the above food ingredient, the method comprising the steps of:

1) providing a source A comprising type A particles, 2) providing a source B comprising type B particles, 3) optionally, providing one or more additional ingredients, 4) combining source A, source B and optionally also the one or more additional ingredients to obtain the food ingredient, and 5) packaging the food ingredient.

Yet an aspect of the invention relates to method of producing a whey protein-based yoghurt-like product comprising the steps of:

a) providing a liquid premix comprising:

a total amount of protein of at least 7% (w/w), a combination of:

type A particles in an amount of at least 20% (w/w) relative to the total amount of protein type B particles in an amount of at least 10% (w/w) relative to the total amount of protein, water, optionally, carbohydrate and wherein at least 90% (w/w) of the protein of the premix is whey protein, b) optionally, homogenising the premix, c) heating the premix to a temperature of least 72 degrees C. for a duration of at least 15 seconds and subsequently cooling the premix to a temperature below 50 degrees C., d) contacting the cooled premix with an acidifying agent and allowing the acidifying agent to acidify the premix to a pH of at most 5.0, e) packaging a yoghurt-like product derived from the acidified premix.

A further aspect of the invention pertains to a whey protein-based yoghurt-like product, e.g. obtainable by the method described herein, comprising:
- a total content of protein of at least 7% (w/w), and
- a combination of:
  - type A particles in an amount of at least 20% (w/w) relative to the total amount of protein
  - type B particles in an amount of at least 10% (w/w) relative to the total amount of protein, and wherein at least 90% (w/w) of the protein is whey protein.

Yet an aspect of the invention pertains to the use of a combination of type A particles and type B particles as ingredient in the production of a whey protein-based yoghurt-like product.

DETAILED DESCRIPTION OF THE INVENTION

Figure 1:
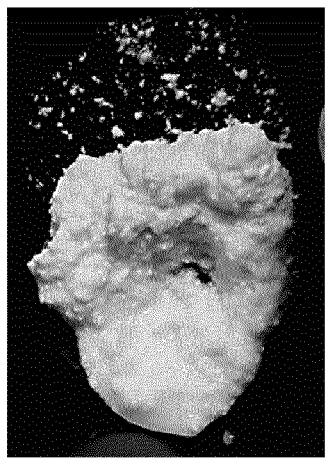
FIG. 1 shows three photos of heat-treated whey protein-based yoghurt premixes. A) is based on undenatured WPC only, B) is based on type A particles and undenatured WPC, and C) is based on the combination of type A and type B particles.
Figure 1:
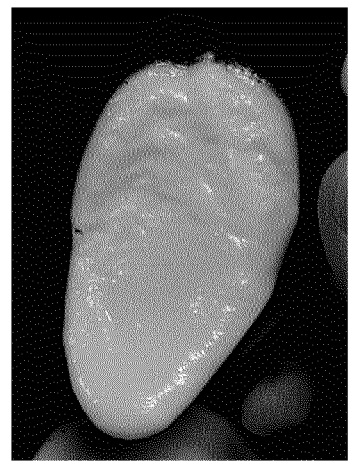
Figure 1:
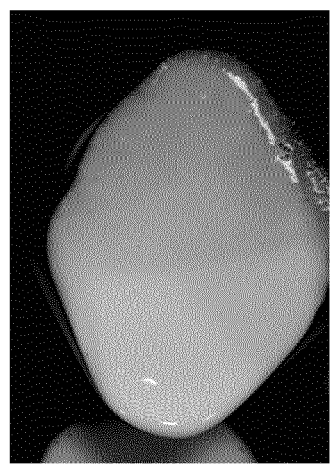

As said, an aspect of the invention pertains to a dry food ingredient comprising:
- a total amount of protein of at least 30% (w/w),
- a combination of:
  - insoluble whey protein particles having a particle size in the range of 1-10 micron (referred to as type A particles) in an amount of at least 20% (w/w) relative to the total amount of protein, and
  - acid-gellable whey protein aggregates having a particle size in the range of 0.02-0.5 micron referred to as type B particles in an amount of at least 10% (w/w) relative to the total amount of protein,
- optionally, carbohydrate, and
- optionally, fat and wherein at least 90% of the protein is whey protein, which includes both native and denatured whey protein.

In the context of the present invention, the term "dry powder" pertains to a powder containing at most 10% (w/w) water and preferably at most 5% (w/w) water.

In the context of the present invention, the term "combination of type A particles and type B particles" or an equivalent wording means that both type A particles and type B particles must be present in the relevant aspect or embodiment of the invention.

In the context of the present invention, the term "insoluble whey protein particles having a particle size in the range of 1-10 micron (referred to as type A particles)" pertain to insoluble particles of denatured whey protein which have a particle size in the range of 1-10 micron. The insoluble whey protein particles are typically produced by heating a solution of whey protein at an appropriate pH (e.g. pH 5-8) while subjecting the solution to a high degree of internal shear. The shear may be provided by mechanical shearing, using e.g. scraped-surface heat-exchangers or homogenizers or by subjecting the solution to high linear flow rates which promote turbulence.

It is also possible to prepare the denatured whey protein compositions using low shear or non-shear microparticulation methods. Such methods typically involve the use of relatively low concentrations of whey protein during heat treatment and precise control of the pH and the concentration of calcium.

The amount (% w/w relative to the total amount of protein) of insoluble whey protein particles having a particle size in the range of 1-10 micron of a composition is determined according to Example 1.1 ($P_{1-10}$).

The term "particles size", when used herein, refers to the hydrodynamic diameter of the particles.

In the context of the present invention, the term "acid-gellable whey protein aggregates having a particle size in the range of 0.02-0.5 micron", also referred to herein as type B particles, relates to aggregates of denatured whey proteins which aggregates are capable of forming strong gels (much stronger than native whey protein) during acidification and which aggregates typically have linear, worm-like, branched or chain-like shapes. Type B particles are often prepared by heat-denaturation of demineralised whey protein in relatively low concentration with or without shear forces acting on the whey protein during the denaturation.

The amount (% w/w relative to the total amount of protein) of type B particles in a composition is determined according to Example 1.10.

The food ingredient may for example comprise a total amount of protein of at least 40% (w/w TS), preferably at least 55% (w/w TS), such at least 75% (w/w TS).

The abbreviation "TS" means total solids.

For example, the food ingredient may comprising a total amount of protein in the range of 30-80% (w/w TS), e.g. in the range of 40-70% (w/w TS), such as in the range 45-65% (w/w TS).

In the context of the present invention, the term "total protein" pertains to the total amount of true protein of a composition or product and disregards non-protein nitrogen (NPN).

It is preferred that the majority of the protein of the food ingredient is whey protein. It is therefore preferred that at least about 90% of the protein of the food ingredient is whey protein. It is more preferred that at least 95% (w/w) of the protein of the food ingredient is whey protein. It is even more preferred that at least 98% (w/w), such as approx. 100% (w/w), of the protein of the food ingredient is whey protein. The whey protein may both be present in the form of native whey protein and/or denatured whey protein.

In the context of the present invention, the phrase "Y and/or X" means "Y" or "X" or "Y and X". Along the same line of logic, the phrase "$n_1, n_2, \ldots, n_{i-1}$, and/or $n_i$" means "$n_1$" or "$n_2$" or ... or "$n_{i-1}$" or "$n_i$" or any combination of the components: $n_1, n_2, \ldots n_{i-1}$, and $n_i$.

In the context of the present invention, the term "whey protein" relates to the proteins which are present in the serum phase of either milk or coagulated milk. The proteins of the serum phase of milk are also sometimes referred to as milk serum proteins or ideal whey. When used herein the term "whey protein" both encompasses the native whey proteins and whey protein in denatured and/or aggregated form.

In the context of the present invention, the term "whey" relates to the liquid composition which is left when casein has been removed from milk. Casein may e.g. be removed by microfiltration providing a liquid permeate which is free of or essentially free of micellar casein but contains the native whey proteins. This liquid permeate is sometimes referred to as ideal whey, serum or milk serum.

Alternatively, the casein may be removed from milk by contacting a milk composition with rennet enzyme, which cleavages kappa-casein into para-kappa-casein and the peptide caseinomacropeptide (CMP), thereby destabilising the casein micelles and causing casein to precipitate. The liquid surrounding the rennet precipitated casein is often referred to as sweet whey and contains CMP in addition to the whey proteins which are normally found in milk.

Casein may also be removed from milk by acid precipitation, i.e. reducing the pH of the milk below pH 4.6 which is the isoelectric point of casein and which causes the casein micelles to disintegrate and precipitate. The liquid surrounding the acid precipitated casein is often referred to as acid whey or casein whey and does not contain CMP.

In the context of the present invention, the terms "native alpha-lactalbumin", "native beta-lactoglobulin", "native CMP", "soluble alpha-lactalbumin", "soluble beta-lactoglobulin" or "soluble CMP" pertain to soluble, non-denatured alpha-lactalbumin, beta-lactoglobulin or CMP which preferably has approximately the same retention time as the standard of alpha-lactalbumin, beta-lactoglobulin or CMP when assayed according to Example 1.2.

The whey proteins used in the present invention are preferably whey proteins from mammalian milk, such as e.g. milk from human, cow, sheep, goat, buffalo, camel, llama, horse and/or deer. In some preferred embodiments of the invention the whey proteins are bovine whey proteins.

The food ingredient may contain minor amounts of other protein types. For example, it may be preferred that at most 10% (w/w) of the protein of the food ingredient is casein and caseinate, preferably at most 5% (w/w), even more preferably at most 1% (w/w), such as at most 0.1% (w/w).

In some preferred embodiments of the invention, the food ingredient contain substantially no casein or caseinate.

As stated above, the food ingredient contains a significant amount of type A particles. The food ingredient may for example comprise type A particles in an amount of at least 30% (w/w) relative to the total amount of protein. Preferably, the food ingredient comprises type A particles in an amount of at least 40% (w/w) relative to the total amount of protein. For example, the food ingredient may comprise type A particles in an amount of at least 50% (w/w) relative to the total amount of protein. The food ingredient may e.g. comprise type A particles in an amount of at least 60% (w/w) relative to the total amount of protein.

For example, the food ingredient may comprise type A particles in an amount in the range of 20-90% (w/w) relative to the total amount of protein, preferably in the range of 30-85% (w/w), and even more preferably in the range of 40-80% (w/w).

The food ingredient may comprise type A particles in an amount of at least 10 g/100 g food ingredient, preferably at least 20 g/100 g food ingredient, and even more preferably at least 30 g/100 g food ingredient.

For example, the food ingredient may comprise type A particles in an amount in the range of 10-80 g/100 g food ingredient, preferably in the range of 20-70 g/100 g food ingredient, and even more preferably in the range of 30-60 g/100 g food ingredient.

The food ingredient also contains a substantial amount of type B particles. The food ingredient may e.g. comprise type B particles in an amount of at least 15% (w/w) relative to the total amount of protein, preferably at least 20% (w/w), and even more preferably at least 25% (w/w).

For example, the food ingredient may comprise type B particles in an amount in the range of 10-80% (w/w) relative to the total amount of protein, preferably in the range of 15-65% (w/w), and even more preferably in the range of 20-50% (w/w).

The food ingredient may e.g. comprise type B particles in an amount of at least 3 g/100 g food ingredient, preferably at least 5 g/100 g food ingredient, and even more preferably at least 10 g/100 g food ingredient.

The food ingredient may e.g. comprise type B particles in an amount of at least 15 g/100 g food ingredient, for example at least 20 g/100 g food ingredient, such as e.g. at least 25 g/100 g food ingredient.

For example, the food ingredient may comprise type B particles in an amount in the range of 3-60 g/100 g food ingredient, preferably in the range of 5-50 g/100 g food ingredient, and even more preferably in the range of 10-45 g/100 g food ingredient, such as in the range of 15-40 g/100 g food ingredient.

In some preferred embodiments of the invention, the food ingredient comprises type A particles in an amount of at least 25% (w/w) relative to the total amount of protein and type B particles in an amount of at least 15% (w/w) relative to the total amount of protein.

For example, the food ingredient may comprise type A particles in an amount of at least 35% (w/w) relative to the total amount of protein and type B particles in an amount of at least 20% (w/w) relative to the total amount of protein.

The food ingredient may e.g. comprise type A particles in an amount in the range of 25-60% (w/w) relative to the total amount of protein and type B particles in an amount in the range of 10-50% (w/w) relative to the total amount of protein.

For example, the food ingredient may comprise type A particles in an amount in the range of 35-50% (w/w) relative to the total amount of protein and type B particles in an amount in the range of 15-40% (w/w) relative to the total amount of protein.

The food ingredient may e.g. comprise type A particles in an amount in the range of 10-80 g/100 g food ingredient and type B particles in an amount in the range of 3-60 g/100 g food ingredient.

Alternatively, the food ingredient may comprise type A particles in an amount in the range of 20-60 g/100 g food ingredient and type B particles in an amount in the range of 10-40 g/100 g food ingredient.

In addition to the types A and B particles, the food ingredient typically also contains soluble whey protein such as undenatured alpha-lactalbumin, undenatured beta-lactoglobulin and caseinomacropeptide (CMP), or very small aggregates of whey protein. CMP is very heat-stabile and does not denature at the temperatures that are used to prepare particles of types A and B. Sources of types A or B particles that have been prepared from sweet whey protein often contain a considerable amount of CMP.

Thus, the food ingredient may furthermore comprise soluble whey protein in an amount of at most 70% (w/w) relative to the total amount of protein, preferably at most 50% (w/w), and even more preferably at most 40% (w/w).

It is preferred that the food ingredient contains even less soluble whey protein, such as soluble whey protein in an amount of at most 30% (w/w) relative to the total amount of protein. Preferably, the food ingredient contains soluble whey protein in an amount of at most 20% (w/w) relative to the total amount of protein. Even more preferably, the food ingredient contains soluble whey protein in an amount of at most 10% (w/w) relative to the total amount of protein.

The food ingredient will often contain at least traces of carbohydrate since the source of the types A or B particles often are produced from carbohydrate-containing feeds. Additional carbohydrate may be included in the food ingredient to provide extra sweetness or to modify the nutritional content of the ingredient.

The food ingredient may e.g. comprise a total amount of carbohydrate of at most 75% (w/w) relative to the total weight of the food ingredient, for example at most 50% (w/w), e.g. at most 30% (w/w).

In some preferred embodiments of the invention, the food ingredient contains a total amount of carbohydrate of at most 20% (w/w), preferably at most 10% (w/w), and even more preferred at most 5% (w/w).

The carbohydrate normally comprises, or even consists of, lactose, galactose and/or glucose. Galactose and glucose are typically present when the lactose level has been reduced by enzymatic hydrolysis.

The food ingredient may furthermore contain fat. The fat is typically present in an amount in the range of 0.1-20% (w/w), such as 0.5-15% (w/w) or 1-10% (w/w). The fat may for example be present in an amount in the range of 0.1-6% (w/w).

The food ingredient may furthermore contain carbohydrate-based stabilisers, such as e.g. locust bean gum, guar gum, alginates, cellulose, xanthan gum, carboxymethyl cellulose, microcrystalline cellulose, carrageenans, pectins, inulin and mixtures thereof. However, in preferred embodiments of the invention it is preferred that the food ingredient contains at most 5% (w/w) carbohydrate-based stabilisers, and preferably most 1% (w/w) carbohydrate-based stabilisers, such as no carbohydrate-based stabilisers.

The food ingredient may furthermore contain salts and minerals which typically are present in whey or milk derived products. The mineral content of food ingredients and products are typically represented as the ash content of the food ingredient or product.

Ash is the inorganic residue remaining after the water and organic matter have been removed by heating in the presence of oxidizing agents, and it should be noted that the product to which the ash content relates does not contain the ash particles as such. The ash content is preferably determined by the technique of dry ashing (see Example 1.6).

The present inventors have found that it is advantageous to reduce the ash content of the food ingredient. The reduced ash-content seems to provide high protein dairy products containing the food ingredient with a more milky flavour relative to high protein dairy products containing food ingredient having a higher ash content.

In some preferred embodiments of the invention, the food ingredient has a total protein:ash content weight ratio of at least 15. Preferably, the total protein:ash content weight ratio of the food ingredient is at least 20. Even more preferably, the total protein:ash content weight ratio of the food ingredient is at least 30. For example, the total protein:ash content weight ratio of the food ingredient may be at least 40, such as at least 50.

For example, the food ingredient may have a total protein:ash content weight ratio in the range of 15-60. The food ingredient may e.g. have a total protein:ash content weight ratio in the range of 20-55. Alternatively, the food ingredient may have a total protein:ash content weight ratio in the range of 25-50, such as in the range of 30-45.

The ash content is determined according to example 1.6 and the total protein is determined according to Example 1.4.

The food ingredient typically contains calcium. The total amount of calcium of the food ingredient may e.g. be in the range of 0.1-3% (w/w) relative to the total weight of the food ingredient, for example in the range of 0.2-2% (w/w), e.g. in the range of 0.3-1% (w/w).

In addition to salts and mineral, the food ingredient furthermore typically contains fat, e.g. milk fat or whey fat. For example, the food ingredient may furthermore comprise fat in an amount of at most 8% (w/w) on a dry weight basis.

In the present context, the term "fat" relates to the total amount of fat in the food product, which can be extracted according to the Röse-Gottlieb principle in which an ammoniacal ethanolic solution of the test sample is extracted with diethyl ether and light petroleum, where after the solvents are removed by distillation or evaporation and finally the mass of extracted substances is determined. Hence, the term "fat" includes, but is not limited to, tri-, di- and monoglycerides, free fatty acids, phospholipids, cholesterols and cholesterol esters.

The food ingredient may e.g. comprise one or more vegetable oil(s) selected from the group consisting of maize oil, sesame oil, soya oil, soya bean oil, linseed oil, grape seed oil, rapeseed oil, olive oil, groundnut oil, sunflower oil, safflower oil and a combination thereof. Alternatively, where the food ingredient may comprise one or more vegetable fat(s), the fat(s) may be selected from the group consisting of palm fat, palm kernel fat and cocoanut fat and a combination thereof.

Additionally, or alternatively, the food ingredient may comprise one or more animal fats, such as a milk fat. The milk fat may be derived from cream, butter or sweet butter milk solids. It is further normal that the food ingredient contains at least traces of whey fat.

If the sources of type A particles and type B particles have been wet-mixed, i.e. mixing by forming a liquid suspension or slurry containing both types of particles, and subsequently co-dried, the food ingredient normally contains dry composite particles comprising both type A particles and type B particles.

In the context of the present invention, the term "composite particles" pertains to larger particles or granulates which are obtained by e.g. spray-drying of a suspension containing the solids of the food ingredient or by wet-granulation, and which composite particle contains both type A particles and type B particles. Such composite particles disintegrate when suspended in a water-containing liquid (e.g. water or milk) and release the solids they contain.

Alternatively, if the food ingredient is prepared by dry-mixing, the sources of the types A and B particles, the food ingredient comprises:
  a first dry composite particle population comprising type A particles but substantially no type B particles, and
  a second dry composite particle population comprising type B particles but substantially no type A particles.

Yet an aspect of the invention pertains to a method of producing a food ingredient, e.g. the food ingredient described above, the method comprising the steps of:
  1) providing a source A comprising type A particles,
  2) providing a source B comprising type B particles,
  3) optionally, providing one or more additional ingredients,
  4) combining source A, source B and optionally also the one or more additional ingredients to obtain the food ingredient, and
  5) packaging the food ingredient.

Sources of type A particles are often produced by heat-denaturation of dissolved whey protein at concentrations in the range of 1-30% (w/w). If the whey protein concentration is higher than approx. 5% (w/w) high shear levels are used during and/or after the denaturation to avoid formation of too large particles.

More details regarding the production of type A particles and sources containing types A particles are found in U.S. Pat. No. 6,605,311, WO 2008/063,115, DE 19950240 A1, DE102012216990 A1, WO 2010/120199, WO 2007/110411, which all are incorporate herein by reference.

Sources of type B particles may also be produced by heat-denaturation of dissolved whey protein but at lower protein concentrations, typically in the range of 1-5% (w/w) and with a reduced level of calcium. Examples of the production of sources of type B particles can be found in U.S. Pat. No. 5,217,741, US 2008/0305235 or in WO 07/110411 (referred to as linear aggregates), which are incorporated herein by reference.

In some preferred embodiments of the invention, at least one of source A and source B is in the form of a liquid suspension.

Step 4) may for example involve converting a suspension comprising both type A particles and type B particles to a powder, e.g. by spray-drying, freeze-drying or other suitable drying techniques.

In some preferred embodiments of the invention, source A and source B are dry powders and step 4) involves dry-mixing of source A and source B. If the food ingredient is to contain one or more additional ingredients these can advantageously also be added in the form of powders and dry-mixed together with source A and source B.

Another aspect of the invention pertains to a food ingredient obtainable according to the method described in herein.

Yet an aspect of the invention pertains to a method of producing a whey protein-based, yoghurt-like product comprising
 a) providing a liquid premix comprising:
  a total amount of protein of at least 7% (w/w),
  a combination of:
   type A particles in an amount of at least 20% (w/w) relative to the total amount of protein
   type B particles in an amount of at least 10% (w/w) relative to the total amount of protein,
  water,
  optionally, carbohydrate
  and wherein at least 90% (w/w) of the protein of the premix is whey protein
 b) optionally, homogenising the premix,
 c) heating the premix to a temperature of least 72 degrees C. for a duration of at least 15 seconds and subsequently cooling the premix to a temperature below 50 degrees C.,
 d) contacting the cooled premix with an acidifying agent and allowing the acidifying agent to acidify the premix to a pH of at most 5.0,
 e) packaging a yoghurt-like product derived from the acidified premix.

In the context of the present invention, the term "yoghurt-like product" pertains to a yoghurt product or a product which has at least the visual appearance and sensory profile similar to that of a yoghurt, be it set-type yoghurt or stirred yoghurt. The term yoghurt-like products also covers yoghurt-like products which are casein-free. It should furthermore be noted that the yoghurt-like product may have been produced by bacterial and/or chemical acidification.

The term "liquid premix" or the "premix" is the liquid composition which is to be heat-treated and acidified in the yoghurt process.

The premix comprises both type A particles and Type B particles. In some preferred embodiments of the invention, the source of the type A particles and the type B particles is a dry food ingredient as described herein. Alternatively, source of the type A particles (source A) and the type B particles (source B) are two different sources.

The premix comprises a total amount of protein of at least 7% (w/w) relative to the total weight of the premix. Preferably, the premix comprises a total amount of protein of at least 10% (w/w). For example, the premix may comprise a total amount of protein of at least 12% (w/w).

The premix may e.g. comprise a total amount of protein in the range of 7-20% (w/w) relative to the total weight of the premix. Preferably, the premix may comprise a total amount of protein in the range of 8-18% (w/w). Even more preferably, the premix may comprise a total amount of protein in the range 10-16% (w/w).

It has been shown that whey protein is a nutritionally advantageous protein source which is quickly absorbed by the human digestion system and it is therefore preferred that most of the protein of the premix is whey protein. In some preferred embodiments of the invention at least 90% of the protein of the premix is whey protein. Preferably, at least 95% (w/w) of the protein of the premix is whey protein. Even more preferably, at least 98% (w/w) of the protein of the premix is whey protein. For example, approx. 100% (w/w) of the protein of the premix may be whey protein.

The premix may contain other proteins than whey protein, such as e.g. casein and/or caseinate. However, in some preferred embodiments of the invention at most 10% (w/w) of the protein of the premix is casein or caseinate (i.e. the sum of casein and caseinate), preferably at most 5% (w/w), even more preferably at most 1% (w/w), such as at most 0.1% (w/w).

In some preferred embodiments of the invention the premix contains substantially no casein or caseinate.

The premix may comprise type A particles in an amount of at least 30% (w/w) relative to the total amount of protein, preferably at least 40% (w/w), more preferably at least 50% (w/w), and even more preferably at least 60% (w/w).

For example, the premix may comprise type A particles in an amount in the range of 20-90% (w/w) relative to the total amount of protein, preferably in the range of 30-85% (w/w), and even more preferably in the range of 40-80% (w/w).

The premix may comprise type A particles in an amount of at least 1.5 g/100 g premix, preferably at least 3 g/100 g premix, and even more preferably at least 5 g/100 g premix.

For example, the premix may comprise type A particles in an amount in the range of 1.5-18 g/100 g premix, preferably in the range of 3-16 g/100 g premix, and even more preferably in the range of 5-14 g/100 g premix.

The premix may comprise type B particles in an amount of at least 10% (w/w) relative to the total amount of protein, preferably at least 15% (w/w), and even more preferably at least 20% (w/w).

For example, the premix may comprise type B particles in an amount in the range of 5-80% (w/w) relative to the total amount of protein, preferably in the range of 10-65% (w/w), and even more preferably in the range of 15-50% (w/w).

The premix may comprise type B particles in an amount of at least 0.5 g/100 g premix, preferably at least 1 g/100 g premix, and even more preferably at least 2 g/100 g food ingredient.

Alternatively, the premix may comprise type B particles in an amount of at least 4 g/100 g premix, for example at least 6 g/100 g premix, such as e.g. at least 8 g/100 g premix.

For example, the premix may comprise type B particles in an amount in the range of 0.5-10 g/100 g premix, preferably in the range of 1-8 g/100 g premix, and even more preferably in the range of 2-6 g/100 g premix.

In some preferred embodiments of the invention the premix comprises type A particles in an amount of at least 25% (w/w) relative to the total amount of protein and type B particles in an amount of at least 10% (w/w) relative to the total amount of protein.

For example, the premix may comprise type A particles in an amount of at least 35% (w/w) relative to the total amount of protein and type B particles in an amount of at least 15% (w/w) relative to the total amount of protein.

Alternatively, the premix may comprise type A particles in an amount in the range of 25-60% (w/w) relative to the total amount of protein and type B particles in an amount in the range of 10-50% (w/w) relative to the total amount of protein.

For example, the premix may comprise type A particles in an amount in the range of 35-50% (w/w) relative to the total amount of protein and type B particles in an amount in the range of 15-40% (w/w) relative to the total amount of protein.

In some preferred embodiments of the invention the premix comprises type A particles in an amount in the range of 3-16 g/100 g premix and type B particles in an amount in the range of 1-8 g/100 g premix.

For example, the premix may comprise type A particles in an amount in the range of 5-14 g/100 g premix and type B particles in an amount in the range of 2-6 g/100 g premix.

In addition to the types A and B particles, the premix typically contains some amounts of soluble whey protein, such as undenatured alpha-lactalbumin, undenatured beta-lactoglobulin and caseinomacropeptide (CMP) or very small aggregates of whey protein. CMP is very heat-stabile and does not denature at the temperatures that are used to prepare particles of type A and B. Sources of type A or B particles that have been prepared from sweet whey protein often contain a considerable amount of CMP.

Thus, in some preferred embodiments of the invention the premix furthermore comprises soluble whey protein in an amount of at most 75% (w/w) relative to the total amount of protein. Preferably, the premix comprises soluble whey protein in an amount of at most 50% (w/w). Even more preferably, the premix furthermore comprises soluble whey protein in an amount of at most 40% (w/w).

Even less soluble whey protein may be preferred, thus, in some preferred embodiments of the invention the premix furthermore comprises soluble whey protein in an amount of at most 30% (w/w) relative to the total amount of protein. For example, the premix may comprise soluble whey protein in an amount of at most 20% (w/w). Alternatively, the premix may comprise soluble whey protein in an amount of at most 10% (w/w).

The premix typically comprises carbohydrate which may serve as nutritional supplement, sweetener and/or as energy source for the bacteria which may be used to acidify the premix.

The premix normally comprises a total amount of carbohydrate of at most 20% (w/w) relative to the total weight of the premix, for example at most 15% (w/w), e.g. at most 10% (w/w), such at most 5% (w/w), e.g. at most 3% (w/w), such as e.g. at most 1% (w/w).

For example, the premix may comprise a total amount of carbohydrate in the range of 0.1-20% (w/w) relative to the total weight of the premix. The premix may e.g. comprise a total amount of carbohydrate in the range of 1-6% (w/w) relative to the total weight of the premix. Alternatively, the premix may comprise a total amount of carbohydrate in the range of 5-15% (w/w) relative to the total weight of the premix.

The premix may furthermore contain fat. The fat may e.g. be present in an amount in the range of 0.1-10% (w/w), such as 0.5-5% (w/w) or 1-3% (w/w). The fat may for example be present in an amount in the range of 0.1-3% (w/w).

The premix typically has a content of total solids (TS) of at least 10% (w/w). Preferably, the premix has a content of total solids of at least 12% (w/w). Even more preferably, premix has a content of total solids of at least 15% (w/w).

The content of total solids of the premix may e.g. be in the range of 10%-approx. 30% (w/w). Preferably, the premix has a content of total solids in the range of 12-30% (w/w). Even more preferably, the premix has a content of total solids in the range of 14-20% (w/w).

The premix furthermore typically contains minerals such as calcium and other minerals that are normally found in dairy products. In some preferred embodiments of the invention the premix comprises a total amount of calcium of in the range of 0.01-1% (w/w) relative to the total weight of the premix, for example in the range of 0.02-0.5% (w/w), e.g. in the range of 0.03-0.3% (w/w).

The pH of the premix is typically in the range of 6-8. For example, the pH of the premix may be in the range of 5.5-8.0. The pH of the premix may e.g. be in the range of 6.0-7.5. Alternatively, the pH of the premix may e.g. be in the range of 6.5-7.0.

All pH-values presented herein have been measured in liquids/solutions having a temperature of 25 degrees C. unless specified otherwise.

When the premix is based on one or more powdered ingredients, it is often preferred to allow the premix to hydrate for a while. For example, the premix may hydrate at a temperature in the range of 1-20 degrees C., preferably 2-10 degrees C., for a duration of at least 30 minutes such as in the range of 1 hour-48 hours.

While step b) is optional, the method preferably contains a step b) of homogenising the premix. The premix of step a) may for example be preheated to a temperature in the range of 40-65 degrees C. and then homogenised at this temperature.

Homogenisation is a well-known process in the art of dairy technology and may e.g. be performed as a one-stage or two-stage process. The homogenisation of the premix may for example be implemented a two-stage process, wherein the first stage uses a pressure of 100-300 bar and the second stage uses a pressure in the range of 30-80 bar.

Step c) involves heat-treating the premix of step a) or b) by heating it to a temperature of at least 72 degrees C., e.g. in the range of 72-150 degrees C., and maintaining the temperature of the premix in that range for a duration sufficient to kill a substantial number of the viable microorganisms of the dairy base. Typically at least 99% of the microorganisms are killed during the pasteurisation. Another purpose of the pasteurisation may be to denature at least some of the native whey protein which may be present in the premix of step a).

The duration of the heat-treatment depends on the temperature(s) to which the premix is heated and is typically somewhere between 1 second and 30 minutes.

It is however preferably that the heat-treatment has a bacteria killing effect which is at least equivalent to that of 72 degrees C. for 15 seconds.

For example, the premix may be heated to one or more temperatures in the range of 72-85 degrees C. for 0.2-30 minutes. The premix may e.g. be heated to one or more temperatures in the range of 80-95 degrees C. for 0.1-15 minutes. Alternatively, the premix may be heated to one or more temperatures in the range of 90-110 degrees C. for 2 second-10 minutes. For example, the premix may be heated to one or more temperatures in the range of 100-150 degrees C. for 1 second-2 minutes.

After the heat treatment the premix is cooled, e.g. to a temperature of at most 50 degrees C., preferably even lower such as at most 45 degrees C. or at most 40 degrees C.

The present inventors have seen indications that heat-treatment of the present type of premix in the temperature range 72-85 degrees C. and preferably in the range 72-80 degrees C. gives rise to improved yoghurt products and in some preferred embodiments of the invention it is preferred to perform the heat-treatment in the temperature range 72-85 degrees C., and preferably in the range 72-80 degrees C.

The cooled premix of step c) is contacted with the acidifying agent in step d).

The acidifying agent may for example be a bacterial culture, typically referred to as a starter culture, in which case the addition of the acidifying agent may be perceived as an inoculation of the cooled premix, in which case one obtains an inoculated premix.

Thus, in some embodiments of the invention the acidifying agent comprises a chemical acidifying agent.

In the context of the present invention the term "chemical acidifying agent" pertains to a chemical compound capable of gradual or instantaneous reduction of the pH of the mixture.

The chemical acidifying agent may for example be a food acceptable acid (also referred as a food acid) and/or a lactone. Examples of useful acids are carboxylic acids such as citric acid, tartaric acid and/or acetic acid. An example of a useful lactone is glucono delta-lactone (GDL).

In some embodiments of the invention the chemical acidifying agent comprises one or more components selected from the group consisting of acetic acid, lactic acid, malic acid, citric acid, phosphoric acid or glucono delta-lactone.

The actual concentration of the chemical acidifying agent depends on the specific formulation of premix. It is generally preferred that the chemical acidifying agent is used in a sufficient amount to reduce the pH of the mixture to at most pH 5.0, and preferably at most pH 5.0, such as e.g. at most pH 4.6.

In some preferred embodiments of the invention the acidifying agent comprises, or even is, a starter culture.

In principle, any type of starter culture traditionally used in making yoghurt-type acidified dairy product may be used. Starter cultures used in the dairy industry are normally mixtures of lactic acid bacterial strains, but a single strain starter culture may also be useful in the present invention. Thus, in preferred embodiments, the one or more starter culture organism of the present process is a lactic acid bacterial species selected from the group consisting of *Lactobacillus, Leuconostoc, Lactococcus,* and *Streptococcus*. Commercial starter culture comprising one or more of these lactic acid bacterial species may be useful in the present invention.

In some preferred embodiments of the invention the starter culture comprises one or more halotolerant bacterial culture(s).

The amount of the added acidifying agent is typically relatively low compared to the amount of the premix.

In some embodiments of the invention the acidifying agent dilutes the premix by a factor of at most 1.05, preferably at most by a factor of 1.01, and even more preferably by a factor of at most 1.005.

Flavouring and/or aromatic agents may be added to the premix to obtain a flavoured acidified dairy product. Flavours may be added as solids, but are preferably added in the form of liquids. However, often it is preferred that the flavours are added after the acidification.

During step d) the acidifying agent is allowed to reduce the pH of the premix of step c).

If the premix is an inoculated premix, it is incubated under conditions permitting the starter culture to become metabolically active to produce the acidified premix. In some preferred embodiments, the inoculated premix is incubated at a temperature between 32° C. and 43° C. until the desired pH is reached. The fermentation may be stopped by decreasing the temperature to around 10° C.

If the premix contains a chemical acidifying agent, the chemical acidifying agent will normally start reducing the pH of the mixture as soon as the chemical acidifying agent forms part of the mixture. Some chemical acidifying agents, such as lactones and slowly dissolving acids, will provide a gradual pH reduction as they react with water or are dissolved.

The temperature of the dairy base during step d) is typically in the range of 20-50 degrees C., and preferably in the range of 32-45 degrees C.

Step e) of the method involves packaging a yoghurt-like product derived from the acidified premix.

The term "derived from the acidified premix" means that the yoghurt-like product contains at least the water-insoluble solids of the acidified premix, i.e. the solids of the acidified premix that do not leave the acidified premix if water is drawn out of the product. The yoghurt-like product preferably comprises, or even consists of, the acidified premix as such.

Deriving the yoghurt-like product from the acidified premix may furthermore include the addition of one or more additional ingredient to the acidified premix.

Useful examples of such additional ingredients are sweeteners, flavouring agents, stabilisers, emulsifiers and vitamins. Examples of such additional ingredients are mentioned in the context of the whey protein-based, yoghurt-like product.

Deriving the yoghurt-like product from the acidified premix preferably includes a smoothing step where the acidified premix is subjected to mild homogenisation, e.g. using a so-called smoothing valve e.g. operated with a pressure-drop of 5-20 bar. Mere pumping of the acidified premix or pumping the acidified premix through a filter may be sufficient to smoothen the acidified premix.

In some preferred embodiments of the invention, deriving the yoghurt-like product from the acidified premix includes, or even consists of, subjecting the acidified product stream, e.g. the acidified premix or the final yoghurt-like product, to a heat-treatment step prior to step e).

In the context of the present invention term "product stream" means the material which is in the process of being converted into the final yoghurt-like product. The product stream contains substantially all solids of the premix and preferably most, if not all, of the water. More ingredients may be added the product stream during the production of the yoghurt-like product.

The present inventors have found that the present the whey protein-based, yoghurt-like product is well-suited for preparation of heat-treated yogurt-like products, i.e. yogurt-like products which have been heat-treated after acidification and therefore has an extended shelf-life.

The heat-treatment step may e.g. involve a combination of temperature and holding time that offers a reduction of the number of viable lactic acid bacteria that at least is equivalent to 72 degrees C. for 15 seconds. For example, the heat-treatment step may involve a combination of temperature and holding time that offers a reduction of the number of viable lactic acid bacteria that at least is equivalent to 75 degrees C. for 30 seconds. Alternatively, the heat-treatment step may involve a combination of temperature and holding time that offers a reduction of the number of viable lactic acid bacteria that at least is equivalent to 80 degrees C. for 1 minute.

The determination of equivalent temperatures and holding times is based on the lactic acid bacteria *Streptococcus thermophilus*.

The acidified product stream may e.g. be heat-treated to a temperature of at least 70 degrees C. for at least 45 seconds. Alternatively, the acidified product stream may be heat-treated to a temperature of at least 72 degrees C. for at least 15 seconds.

For example, the acidified product stream may be heat-treated to a temperature of at least 75 degrees C. for at least 15 seconds, such as e.g. at least 30 seconds.

In some preferred embodiments of the invention, the acidified product stream is heat-treated to a temperature of in the range of 70-95 degrees C. for a duration in the range of 0.1-100 seconds, such as e.g. in the range of 70-80 degrees C. for a duration in the range of 2-50 seconds.

In some preferred embodiments of the invention, the heat-treatment step is the last process step that is performed before the packaging of the yoghurt-like product.

However, in other preferred embodiments of the invention the heat-treatment of the acidified product stream follows and/or is proceeded by a homogenisation step.

For example, deriving the yoghurt-like product from the acidified premix may include heat-treating the acidified product stream, e.g. the acidified premix as such or the acidified premix mixed with sweetener and/or flavouring agents, and subsequently homogenising the heat-treated, acidified product stream.

The homogenisation used after the heat-treatment may be for example involve one or multiple steps. A pressure drop in the range of 10-300 bar may e.g. be used, preferably in the range of 100-220 bar, and even more preferably in the range of 150-200 bar.

The packaging of step e) may involve any suitable packaging techniques, and any suitable container may be used for packaging the whey protein-based, yoghurt-like product.

The packaging of step e) may for example involve aseptic packaging, i.e. the product is packaged under aseptic conditions. For example, the aseptic packaging may be performed by using an aseptic filling system, and it preferably involves filling the product into one or more aseptic container(s).

Examples of useful containers are e.g. bottles, cartons, bricks, pouches and/or bags.

In a preferred embodiment of the invention, the whey protein-based, yoghurt-like product is packaged in a pouch having a total capacity of at most 0.5 L which pouch is subsequently closed or sealed. The volume of the pouch may for example be in the range of 0.05-0.5 L and preferably in the range of 0.1-0.4 L.

The whey protein-based, yoghurt-like product is preferably packaged with a relatively small headspace, i.e. extra gas inside the container.

The properties of the present whey protein-based, yoghurt-like product makes it well-suited for packaging in pouches, where a low degree of syneresis and a low degree of particle sedimentation are advantageous.

The packaging is preferably performed at or below room temperature. Thus, the temperature of the product is preferably at most 30 degrees C. during the packaging, preferably at most 25 degrees C. and even more preferably at most 20 degrees C., such as at most 10 degrees C.

The temperature of the product during packaging may for example be in the range of 2-30 degrees C., and preferably in the range of 5-25 degrees C.

Alternatively, the packaging may be performed by a temperature of at least 55 degrees C., e.g. when the method involves heat-treatment of the acidified product stream. Thus, the temperature of the product may be preferably at least 60 degrees C. during the packaging, such as e.g. at least 65 degrees C.

The temperature of the product during packaging may for example be in the range of 55-75 degrees C., and preferably in the range of 60-70 degrees C.

The present inventors have found that the shelf-life of the yoghurt-like product is improved by filling/packaging the yoghurt-like product while it is still warm. The packaging the yoghurt-like product is subsequently typically cooled to room temperature or to a temperature of at most 10 degrees C., such as e.g. approx. 4-5 degrees C.

Yet an aspect pertains to a whey protein-based yoghurt-like product obtainable by a method described herein.

Another aspect of the invention pertains to a food product containing the food ingredient as described herein. The food product may for example be a dairy product or a nondairy product. The foods product may for example be a high protein product, e.g. an acidic, high protein food product. A high protein food product is a food product that contains a total amount of protein of at least 7% (w/w).

It is particularly preferred that the food product is a high protein, acidified food product, e.g. a dairy product, containing at total amount of protein of at least 7% (w/w). Examples of such acidified food products are yoghurts, puddings, mayonnaises, and dressings. The food products preferably contain a significant amount of whey protein. For example whey protein may constitute at least 50% (w/w), preferably at least 70% (w/w) and even more preferably at least 90% (w/w) of the protein of the high protein food product. For example, the protein of the high protein food product may essentially consist of whey protein.

A further aspect of the invention pertains to a whey protein-based yoghurt-like product, e.g. obtainable by a method described herein, comprising:
  a total content of protein of at least 7% (w/w), and
  a combination of:
    type A particles in an amount of at least 20% (w/w) relative to the total amount of protein
    type B particles in an amount of at least 10% (w/w) relative to the total amount of protein,
  and wherein at least 90% of the protein is whey protein.

The present inventors have found that whey protein-based yoghurt-like products according to the present invention have more attractive organoleptic properties than products based on native whey protein only or based on a combination of microparticulated whey protein and native whey protein concentrate.

The composition of the whey protein-based yoghurt-like product may be the same as that of the premix.

In some preferred embodiments of the invention the whey protein-based yoghurt-like product has a total amount of protein of at least 7% (w/w), such as e.g. at least 8% (w/w). For example, the whey protein-based yoghurt-like product may have a total amount of protein of at least 10% (w/w). The whey protein-based yoghurt-like product may e.g. have a total amount of protein of at least 12% (w/w). Alternatively, the whey protein-based yoghurt-like product may e.g. have a total amount of protein of at least 14% (w/w).

An even higher protein content may be desired, thus, the whey protein-based yoghurt-like product may have a total amount of protein of at least 16% (w/w). The whey protein-based yoghurt-like product may e.g. have a total amount of protein of at least 18% (w/w). Alternatively, the whey protein-based yoghurt-like product may e.g. have a total amount of protein of at least 21% (w/w).

Typically, the whey protein-based yoghurt-like product has a total amount of protein in the range of 7-25% (w/w). For example, the whey protein-based yoghurt-like food product may contain a total amount of protein in the range of 8-20% (w/w). The whey protein-based yoghurt-like product may e.g. contain a total amount of protein of at least 10-18% (w/w). Alternatively, the whey protein-based yoghurt-like product may contain a total amount of protein of at least 12-16% (w/w).

In some embodiments of the invention, the whey protein-based, yoghurt-like product contains a total amount of protein in the range of 21-25% (w/w).

The whey protein-based yoghurt-like product preferably has a pH of at most 5.0. For example, the whey protein-based yoghurt-like product may have a pH at most 4.4. The pH range of the whey protein-based yoghurt-like product is typically pH 3.5-5.0. Preferably, the whey protein-based yoghurt-like product has a pH in the range of pH 4.0-5.0. Even more preferably, the whey protein-based yoghurt-like product has a pH in the range of pH 4.2-4.8, such as e.g. approx. pH 4.6.

In some preferred embodiments of the invention a whey protein-based yoghurt-like product has the consistency of a set-type yoghurt. Set-type yoghurts are typically characterised in a gelly-like texture and are often allowed to incubate and cool in the final package. Set-type yoghurts are normally non-pourable, but still spoonable, and are often eaten out of the packaging with a spoon.

In other preferred embodiments of the invention the whey protein-based yoghurt-like product has the consistency of a stirred-type yoghurt. Relative to a set-type yoghurt, a stirred-type yoghurt is pourable but often still rather viscous. The term "stirred" is most likely based on the fact that the acidified yoghurt milks originally were stirred to break the formed coagulum/gel and make the product more liquid and pumpable. However, in the context of the present invention, the term "stirred yoghurt" also encompasses yoghurts which have not been subjected to stirring, but which have obtained a liquid-like, viscous texture by other ways.

A whey protein-based yoghurt-like product having a consistency of a stirred-type yoghurt may for example have a viscosity of at most 2500 cP, and typically in the range of 350-2500 cP. For example, the viscosity of the whey protein-based yoghurt-like product may be in the range of 400-2000 cP. The viscosity of the whey protein-based yoghurt-like product may e.g. be in the range of 500-1500 cP. Alternatively, the viscosity of the whey protein-based yoghurt-like product may be in the range of 600-1250 cP. Viscosities of whey protein-based yoghurt-like products are measured as outlined in Example 1.3.

In some preferred embodiments of the invention, the whey protein-based yoghurt-like product comprises one or more sweeteners, such as carbohydrate sweeteners, polyols and/or high intensity sweeteners.

The whey protein-based yoghurt-like product may e.g. comprise a total amount of carbohydrate sweetener in the range of 1-20% (w/w) relative to the total weight of the whey protein-based yoghurt-like product. Alternatively, the whey protein-based yoghurt-like product may comprise a total amount of carbohydrate sweetener in the range of 4-15% (w/w) relative to the total weight of the whey protein-based yoghurt-like product. Since other ingredients of the whey protein-based yoghurt-like product inherently may comprise some carbohydrate sweetener, such as lactose, it will often be sufficient to add carbohydrate sweetener in an amount of about 2-10% relative to the total weight of the whey protein-based yoghurt-like product to reach the desired sweetness of taste. Alternatively, the whey protein-based yoghurt-like product may comprise a total amount of added carbohydrate sweetener in the range of 4-8% (w/w) relative to the total weight of the whey protein-based yoghurt-like product.

The whey protein-based yoghurt-like product may furthermore contain one of more non-carbohydrate natural or artificial sweetener.

In some embodiments the whey protein-based yoghurt-like product contains one or more natural sweetening agent(s) that are not sugars. These natural sweetening agent(s) may be provided as a component of a second sweetening agent, either alone, or in combination with a carbohydrate sweetener, as described. The natural non-sugar sweetening agent(s) may for example be selected from the group consisting of Momordica Grosvenorii (Mogrosides IV or V) extracts, Rooibos extracts, Honeybush extracts, Stevia extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, isomaltulose and/or natural polyols such as maltitol, mannitol, lactitol, sorbitol, inositol, xylitol, threitol, galactitol and combinations thereof.

In some embodiments the whey protein-based yoghurt-like product contains one or more artificial sweetening agent(s). These artificial sweetening agent(s) may be provided as a component of the first sweetener, either alone or in combination with other of the sweeteners as defined above. The artificial non-sugar sweetening agent(s) may for example be selected from the group consisting of Aspartame, Cyclamate, Sucralose, Acesulfame K, neotame, Saccharin, Neohesperidin dihydrochalcone, Stevia extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR) and combinations thereof.

In some embodiments of the invention it is particularly preferred that the sweetener comprises or even consists of one or more high intensity sweeteners (HIS). HIS are both found among the natural and the artificial sweeteners and typically have a sweetening intensity of at least 10 times that of sucrose. Non-limiting examples of useful HIS are Aspartame, Cyclamate, Sucralose, Acesulfame K, neotame, Saccharin, Neohesperidin dihydrochalcone and combinations thereof.

If used, the total amount of HIS is typically in the range of 0.01-2% (w/w). For example, the total amount of HIS may be in the range of 0.05-1.5% (w/w). Alternatively, the total amount of HIS may be in the range of 0.1-1.0% (w/w).

It may furthermore be preferred that the sweetener comprises or even consists of one or more polyol sweetener(s). Non-limiting examples of useful polyol sweetener are maltitol, mannitol, lactitol, sorbitol, inositol, xylitol, threitol, galactitol or combinations thereof.

If used, the total amount of polyol sweetener is typically in the range of 1-20% (w/w). For example, the total amount of polyol sweetener may be in the range of 2-15% (w/w). Alternatively, the total amount of polyol sweetener may be in the range of 4-10% (w/w).

The whey protein-based yoghurt-like product may furthermore comprise one of more vitamin(s) and similar other ingredients such as vitamin A, vitamin D, vitamin E, vitamin K, thiamine, riboflavin, pyridoxine, vitamin B12, niacin, folic acid, pantothenic acid, biotin, vitamin C, choline, inositol, their salts, their derivatives and combinations thereof.

The whey protein-based yoghurt-like product may furthermore contain carbohydrate-based stabilisers, such as e.g. locust bean gum, guar gum, alginates, cellulose, xanthan gum, carboxymethyl cellulose, microcrystalline cellulose, carrageenans, pectins, inulin and mixtures thereof.

However, an advantage of the present invention is that the level of carbohydrate-based stabilisers can be reduced or even avoided, thus in preferred embodiments of the invention the whey protein-based yoghurt-like product comprises at most 1% (w/w) carbohydrate-based stabilisers, and preferably most 0.1% (w/w) carbohydrate-based stabilisers, and even more preferably no carbohydrate-based stabilisers.

The whey protein-based yoghurt-like product may furthermore contain one of more flavouring agents such as natural or artificial fruit or vegetable flavours, fruit preparations, fruit-juice or even pieces of fruits and/or vegetables. Such flavouring agents are well-known in the art.

The whey protein-based yoghurt-like product may furthermore contain fat. The fat may e.g. be present in an amount in the range of 0.1-10% (w/w), such as 0.5-5% (w/w) or 1-3% (w/w). The fat may for example be present in an amount in the range of 0.1-3% (w/w).

The whey protein-based yoghurt-like product may for example be a stirred-type yoghurt-like product or a set-type yoghurt-like product.

In some preferred embodiments of the invention, the whey protein-based yoghurt-like product is a heat-treated, whey protein-based, yoghurt-like product meaning that the method of producing the yoghurt-like product has involved heat-treatment of the acidified product stream. Such a heat-treatment step extends the shelf-life of the product and allows for storage of the packaged product at room temperature for an extended period of time.

In some preferred embodiments of the invention, the whey protein-based yoghurt-like product, preferably in heat-treated form, has a shelf-life of at least 2 months at 23 degrees C., preferably at least 3 months, and even more preferred at least 6 months.

In some preferred embodiments of the invention, the whey protein-based yoghurt-like product, preferably in heat-treated form, has a shelf-life of at least 3 months at 5 degrees C., preferably at least 6 months, and even more preferred at least 9 months. For example, the heat-treated, whey protein-based yoghurt-like product may have a shelf-life of at least 12 months at 5 degrees C.

Another aspect of the invention pertains to the use of a combination of type A particles and type B particles as ingredient in the production of an acidified dairy product, such as e.g. a whey protein-based yoghurt-like product.

The type A particles and type B particles may e.g. be provided by two separate sources, e.g. a source A containing the type A particles and a source B containing the type B particles. Alternatively, the type A particles and type B particles may be providing by a single source which both contains type A particles and type B particles. An example of such a single source the food ingredient described herein.

Preferably, the type A particles are used in an amount of at least 20% (w/w) relative to the total amount of protein of the acidified dairy product, e.g. the yoghurt-like product, and the type B particles are used in an amount of at least 10% (w/w) relative to the total amount of protein of the acidified dairy product, e.g. the yoghurt-like product.

The acidified dairy product, e.g. the whey protein-based yoghurt-like product, may e.g. have a total protein content of at least 7% (w/w), and preferably at least 10% (w/w).

The whey protein-based yoghurt-like product may for example be a stirred-type yoghurt-like product or a set-type yoghurt-like product.

It should be noted that the embodiments and features described in the context of one of the aspects of the present invention also apply to the other aspects of the invention.

All patent and non-patent references cited in the present application are hereby incorporated by reference in their entirety.

The invention will now be described in further details in the following non-limiting examples.

EXAMPLES

Example 1: Methods of Analysis

Example 1.1: Quantification of the Amount of Insoluble Microparticles (Type A Particles)

The amount of insoluble whey protein particles having a particles size in the range of 1-10 micron (effectively encompassing the size range 0.5-10.49 micron) of a denatured whey protein composition is determined using the following procedure:

1. Make a 5% (w/w in water) suspension of the sample to be tested.
2. Let the resulting suspension rehydrate for one hour with gentle agitation (stirring).
3. Homogenize the suspension at 100 bar.
4. Centrifuge a first portion of the suspension at 15000 g for 5 minutes.
5. Collect the resulting supernatant and analyse for total protein (true protein). The amount of total protein of the supernatant is referred to as "A".
6. Analyse a second portion of the suspension (not subjected to centrifugation) for total protein (true protein). The amount of total protein of the suspension is referred to as "B".
7. Subject a third portion of the suspension to particle size distribution analysis by static light scattering and determine the percentage by volume of the particles that has a particle size>10 micron, this percentage is referred to "C".

8. Determine the amount (% w/w relative to total protein) of insoluble whey protein particles having a particle size the range of 1-10 micron as:

$$P_{1-10} = (((B-A)/B)*100\%) - C$$

9. Repeat steps 4-5, but centrifuging at 3000 g for 5 minutes instead of 15000 g. (only the largest part of the particles will be removed). The total protein of the supernatant of step 9 is referred to as "D".

10. Determine the amount (% w/w relative to total protein) of insoluble whey protein particles having a particle size the range of 0.5-1.5 micron as:

$$P_1 = ((D-A)/B)*100\%$$

The procedure is performed at approx. 15 degrees C. using a refrigerated centrifuge 3-30K from SIGMA Laborzentrifugen GmbH and 85 mL tubes (Order no. 15076), in which the 5% suspension is filled so that the total weight of tube and sample amounts to 96 g.

Particle size distribution analysis is performed using a Malvern Mastersizer (Micro Particle Sizer, Malvern Instruments Ltd., Worcestershire, UK).

Parameters: Particle refractive index 1.52 (real part), 0.1 (imaginary part) and dispersant refractive index 1.33 were used.

Data analysis: The data was fitted using the Mie scattering model (residuals<2%).

Example 1.2: Determination of Soluble CMP, Alpha-Lactalbumin, and Beta-Lactobulin The content of soluble CMP, alpha-lactalbumin, and beta-lactobulin was analyzed by size exclusion high performance liquid chromatography (SE-HPLC). A Waters 600 E Multisolvent Delivery System, a Waters 700 Satellite Wisp Injector, and a Waters H90 Programmable Multiwavelength Detector (Waters, Milford, MA, USA) were used. The elution buffer was composed of 0.15 M Na2SO4, 0.09 M KH2PO4 and 0.01 M K2HPO4. The flow rate was 0.8 mL min-1 and the temperature 20° C.

Twenty-four hours prior to analysis, suspensions of the denatured whey protein compositions were prepared by using a sodium phosphate buffer (0.02 M) to obtain a final protein content of 0.1% (w/v). In addition, standard solutions of alpha-lactalbumin (Sigma-Aldrich Chemie GmbH, Steinheim, Germany) and beta-lactoglobulin (Sigma-Aldrich Chemie GmbH), and caseinomacropeptide at a concentration of 1 mg mL-1 were prepared. Prior to injection, the solutions were stirred and filtered (0.22 micron). A 25 microL sample was injected. The absorbance was recorded at 210 and 280 nm. For all the samples denatured whey protein compositions and the standards, the total protein content was determined according to Example 1.4.

Quantitative determination of the contents of native alpha-lactalbumin, beta-lactoglobulin, and caseinomacropeptide was performed by comparing the peak areas obtained for the corresponding standard proteins with those of the samples.

Example 1.3: Determination of Viscosity

The viscosity of liquid products was measured on a rheometer (Haake rheostress) with a bob/cup system.

The measurement was performed at 5 degrees C. (both the temperature of the liquid sample and the relevant parts of the rheometer had a temperature of 5 degrees C.).

Procedure:

1. Sample Preparation

Each sample is filled into bottles during processing and placed in the laboratory cooler (5° C.) to temperate for 1 day.

2. Setup

Set up the program for measurement of the product on the Haake rheostress, see method setup.

Install the bob/cup system. Check that the temperature of the water bath for HAAKE rheostress is set at 1° C., if not adjust the temperature.

3. Measuring

Only the sample that is to be analysed is removed from the cool storage, the sample bottle is gently turned upside down 3 times to homogenise the sample if it is phase separated during storage. Add 40 ml sample to the cup and start the data-sampling programme. A double repetition is made.

4. Cleaning

When the analysis is finished, dismantle the bob/cup system and clean it with water and soap and afterwards with cold water to temperate the system before the next measurement. Wipe the bob/cup system and install it again for the next sample.

Results:

The viscosity is presented in the unit centipoise (cP). Based on the cP-value read after 90 sec. (t(seq)), an average of the double repetition is calculated. The higher the measured cP values are, the higher the viscosity.

Materials:

For this procedure the following is required:

Haake rheostress 1 rheometer

Bob: Z34 DIN 53019 series

Cup: Z34 DIN53018 series probes

Water bath Haake K20/Haake DC50

Method Setup:

The parameters for the programme were as follows:

Step 1: Measurement position

Step 2: Controlled Stress of 1.00 Pa for 30 sec. at 5.00° C. Frequency of 1.000 Hz. 2 data points are collected Step 3: Controlled Rate of 50.00 I/s for 120 sec. at 5.00° C. 30 data points are collected Step 4: Lift apart Example 1.4: Determination of Total Protein The total protein content (true protein) of a sample is determined by:

1) Determining the total nitrogen of the sample following ISO 8968-1/2|IDF 020-1/2-Milk—Determination of nitrogen content—Part 1/2: Determination of nitrogen content using the Kjeldahl method.

2) Determining the non-protein nitrogen of the sample following ISO 8968-4|IDF 020-4-Milk—Determination of nitrogen content—Part 4: Determination of non-protein-nitrogen content.

3) Calculating the total amount protein as $(m_{total\ nitrogen} - m_{non-protein-nitrogen})*6.38$.

Example 1.5: Determination of the Water Content of a Powder

The water content of a food product is determined according to ISO 5537:2004 (Dried milk—Determination of moisture content (Reference method)). NMKL is an abbreviation for "Nordisk Metodikkomité for Næingsmidler".

Example 1.6: Determination of Ash Content

The ash content of a food product is determined according to NMKL 173:2005 "Ash, gravimetric determination in foods".

Example 1.7: Determination of the Dry Weight of a Solution

The dry-weight of a solution may be determined according NMKL 110 $2^{nd}$ Edition, 2005 (Total solids (Water)—Gravimetric determination in milk and milk products). NMKL is an abbreviation for "Nordisk Metodikkomité for Næingsmidler".

The water content of the solution can be calculated as 100% minus the relative amount of dry-matter (% w/w).

Example 1.8: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.9: Determination of the Degree of Denaturation

The denaturation degree of the proteins of the denatured whey protein compositions was analyzed by size exclusion high performance liquid chromatography (SE-HPLC). A Waters 600 E Multisolvent Delivery System, a Waters 700 Satellite Wisp Injector, and a Waters H90 Programmable Multiwavelength Detector (Waters, Milford, MA, USA) were used. The elution buffer was composed of 0.15 M Na2SO4, 0.09 M KH2PO4 and 0.01 M K2HPO4. The flow rate was 0.8 mL min-1 and the temperature 20° C.

Twenty-four hours prior to analysis, suspensions of the denatured whey protein compositions were prepared by using a sodium phosphate buffer (0.02 M) to obtain a final protein content of 0.1% (w/v). In addition, standard solutions of alpha-lactalbumin (Sigma-Aldrich Chemie GmbH, Steinheim, Germany) and beta-lactoglobulin (Sigma-Aldrich Chemie GmbH), and caseinomacropeptide at a concentration of 1 mg mL-1 were prepared. Prior to injection, the solutions were stirred and filtered (0.22 micron). A 25 microL sample was injected. The absorbance was recorded at 210 and 280 nm. For all the samples denatured whey protein compositions and the standards, the total protein content was determined according to Example 1.4

A quantitative analysis of the native whey protein content was performed by comparing the peak areas obtained for the corresponding standard proteins with those of the samples. Afterwards, the denatured whey protein content of the denatured whey protein compositions were calculated by considering the total protein content of the samples and their quantified native protein. The degree of denaturation was calculated as $(w_{total\ protein} - w_{solutble\ protein})/w_{total\ protein} * 100\%$, wherein $w_{total\ protein}$ is the weight of total protein and $w_{solutble\ protein}$ is the weight of soluble protein.

Example 1.10: Quantification of Type B Particles

The amount of acid-gellable whey protein particles having a particles size in the range of 0.02-0.5 micron (type B particles) is determined using the following procedure, where micro-particles are remove by centrifugation at 15000 g for 5 min and wherein the remaining type B particles are quantified by HPLC by quantifying the amount of protein having a size equal to or smaller than beta-lactoglobulin (having a relatively long retention time) and the amount of larger protein aggregates (having a shorter retention time).

Materials:
  phosphate buffer (0.02 M, pH 7.5)
  Acetonitrile buffer (consisting of 470.0 g miliQ water, 413.4 g acetonitrile and 1.0 ml triflouroacetic acid)

Procedure:
1. Dissolving a sample of approx. 1.00 g powder in phosphate buffer to obtain 1000 mL. If the sample is in the form of a liquid, then a liquid sample containing approx. 1.00 g dry matter is diluted to 1000 mL with phosphate buffer. Write down the precise dilution factor (typically close to 1000). Allow the dissolved (or diluted) sample to stand for 24 hours before proceeding to step 2.
2. Determine the amount total protein (true protein) of the dissolved sample. The amount of total protein of the dissolved sample is referred to as "X" (% (w/w) total protein relative to total weight of the dissolved sample).
3. Centrifuge 100 mL of the dissolved sample at 15000 g for 5 minutes.
4. Collect the resulting supernatant and filter it through a 0.45 micron Whatman filter to remove traces of microparticles that could damage the HPLC-column of the following HLPC analysis.
5. Determine the total protein (true protein) of the filtered supernatant. The amount of total protein of the filtered supernatant is referred to as "Y" (% (w/w) total protein relative to total weight of the filtered supernatant).
6. Quantify the amount (% (w/w) relative to total weight of the filtered supernatant) of beta-lactoglobulin, alpha-lactalbumin and caseinomacropeptide of the filtered supernatant by HPLC using appropriate standards of beta-lactoglobulin, alpha-lactalbumin and CMP dissolved in the phosphate buffer. Use the acetonitrile solution as eluent for the HPLC analysis. If the protein concentration of the filtered supernatant is higher than 0.1% (w/w), a sample of the filtered supernatant is further diluted to obtain a protein concentration of approx. 0.1% (w/w) and perform the HPLC analysis on the further diluted sample.
7. Calculate the Relative amount of type B particles (% (w/w) type B particles relative to total amount of protein of the original sample). This can be done using the formula:

$$Z_{Relative\ amount\ of\ type\ B\ particles} = ((Y - C_{alpha} - C_{beta} - C_{CMP})/X) * 100\% (w/w\ \text{total protein of the original sample})$$

The absolute amount of type B particles of the original sample is calculated by multiplying the relative amount of type B particles with X* dilution factor (going from 1 g sample to 1000 mL (=approx. 1000 g) dissolved sample gives a dilution factor of 1000). The formula looks like this:

Absolute amount of type $B$ particles of the original sample=
$Z_{Relative\ amount\ of\ type\ B\ particles} * X * $ dilution factor The centrifugation is performed at approx. 15 degrees C. using a refrigerated centrifuge 3-30K from SIGMA Laborzentrifugen GmbH and 85 mL tubes (Order no. 15076) or similar equipment.

The HPLC is performed using 2 columns of TSKgel3000PWxl (7.8 mm 30 cm) connected in series with attached precoloum PWxI (6 mm×4 cm) The columns are from Tosohass, Japan) and using a UV detector.

Example 2: Production of a Whey Protein-Based, High Protein Yoghurt Product

Six samples of whey protein-based yoghurt products were prepared using the following ingredients and the following procedure.

Procedure:

The dry ingredients were blended with the liquids and then allowed to hydrate at 5 degrees C. for 20 hours. After the hydration, the mixture was heated to 65 degrees C. and then homogenised in two stages at 200 bar and 50 bar, respectively. The mixtures were subsequently heat-treated to a temperature of 80 or 90 degrees C. for 5 minutes using a plate heat exchanger and then cooled to 42 degrees C. Once cooled, the heat-treated mixtures were mixed with a yoghurt starter culture (Culture YC-X11, Chr. Hansen A/S, Denmark) in an amount of 0.02% and the inoculated mixtures were allowed to incubate at 42 degrees C. until a pH of 4.5 was reached.

The acidified mixtures subjected to smoothing at 42 degrees C. using a smoothing valve and a pressure drop of 10 bar. The resulting smoothened yoghurt products were finally cooled to 5 degrees C. and packaged.

Ingredients and Sample Composition:

An overview of the ingredients and the procedure variants are shown in the table below:

globulin. The non-protein dry-matter of the whey protein powder is primarily lactose, fat and minerals.

Source of Type B Particles:

A whey protein powder comprising approx. 50% (w/w) total protein. The total protein is composed of approx. 60% (w/w) acid-gellable whey protein aggregates (type B particles) and approx. 40% soluble whey protein, which mainly contains CMP, alpha-lactalbumin and beta-lactoglobulin. The non-protein dry-matter of the whey protein powder is primarily lactose, fat and minerals.

Whey Protein Permeate Powder:

The whey protein permeate powder is obtained by drying protein-free ultrafiltration permeate of sweet whey.

Results and Conclusion:

Samples 3 and 6 (undenatured whey protein, no particles of type A or B) were found to be unsuitable for heat-treatment at both 80 and 90 degrees C. as prolonged heating of these samples resulted in severe gel formation. A photo of the heat-treated sample 6 was taken and as can be seen from FIG. 1-A) the heat-treated (but not acidified!) sample 6 had a visual appearance like rice-pudding and had an extremely sandy and grainy texture and a high viscosity which could clog the plate heat exchanger.

It was therefore decided not to prepare yoghurts from samples 3 and 6.

Photos of sample 5 (FIG. 1-B) and sample 4 (FIG. 1-C) are shown and as can been seen, sample 5 (type A particles and undentured WPC) had some tendencies to sandiness and a fairly high viscosity. Sample 4 (the combination of type A particles and Type B particles), however had a smooth appearance and what seemed to be a relatively low viscosity.

| | Sample no. | | | | | |
|---|---|---|---|---|---|---|
| | 1 | 2 | 3 | 4 | 5 | 6 |
| Ingredients % (w/w) | | | | | | |
| Water | 82.68 | 82.7 | 82.0 | 82.68 | 82.7 | 82.0 |
| Cream, 38% fat | 2.00 | 1.81 | 1.90 | 2.00 | 1.81 | 1.90 |
| Undenatured WPC80 | 0 | 4.71 | 12.43 | 0 | 4.71 | 12.43 |
| Source of Type A particles | 7.11 | 7.11 | 0 | 7.11 | 7.11 | 0 |
| Source of type B particles | 7.05 | 0 | 0 | 7.05 | 0 | 0 |
| Whey permeate powder | 1.16 | 3.66 | 3.67 | 1.16 | 3.66 | 3.67 |
| Nutritional composition % (w/w) | | | | | | |
| Protein | 9.61 | 9.61 | 9.61 | 9.61 | 9.61 | 9.61 |
| Fat | 1.47 | 1.47 | 1.47 | 1.47 | 1.47 | 1.47 |
| Carbohydrate | 3.60 | 3.60 | 3.60 | 3.60 | 3.60 | 3.60 |
| Process variants | | | | | | |
| Heat treatment | 80 degrees C. for 5 min. | 90 degrees C. for 5 min. | 80 degrees C. for 5 min. | 90 degrees C. for 5 min. | 80 degrees C. for 5 min. | 90 degrees C. for 5 min. |

Undenatured WPC80:

A substantially undenatured whey protein concentrate powder containing approx. 80% (w/w) protein based on sweet cheese whey.

Figure 2:
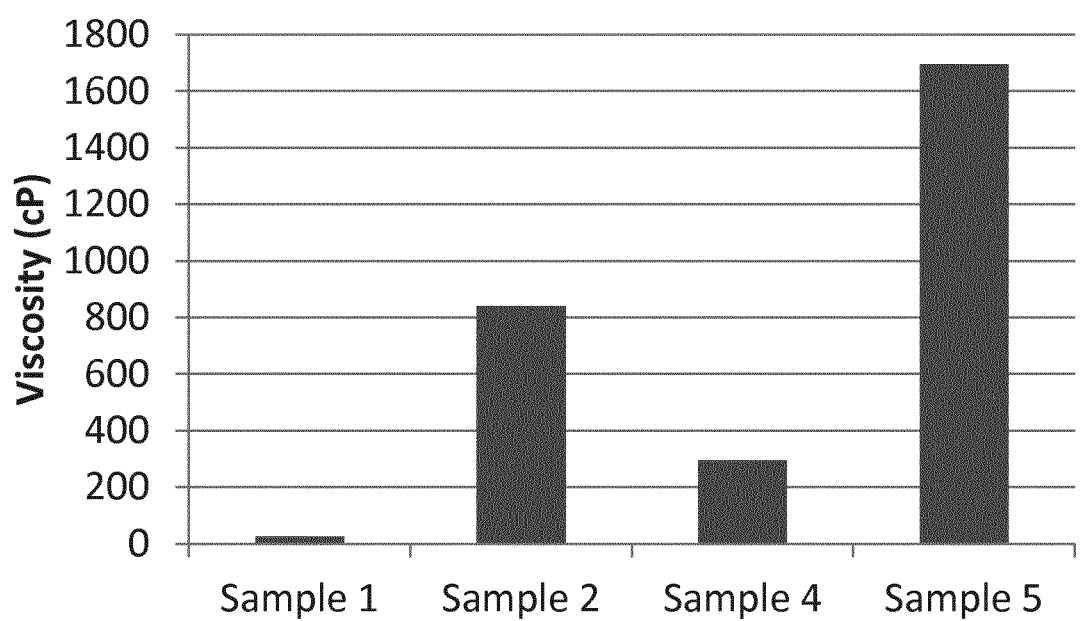
FIG. 2 shows the measured viscosities of four heat-treated whey protein-based yoghurt premixes.

Source of Type A Particles:

A whey protein powder comprising approx. 82% (w/w) total protein. The total protein is composed of approx. 67% (w/w) microparticles of denatured whey protein (type A particles) and approx. 33% soluble whey protein which mainly contains CMP, alpha-lactalbumin and beta-lacto- This was confirmed by viscosity measurements performed according to Example 1.3 and the results have been reproduced in FIG. 2. Here it is confirmed that the viscosity of sample 1 is much lower than that of sample 2 and that the viscosity of sample 4 is much lower than that of sample 5.

The inventors perceive a low viscosity after heat-treatment as advantageous as it eases the subsequent processing of the mixture before the acidification and it make the mixing a yoghurt starter culture (or a chemical acidifying agent) into the heat-treated mixture more easy.

Figure 3:
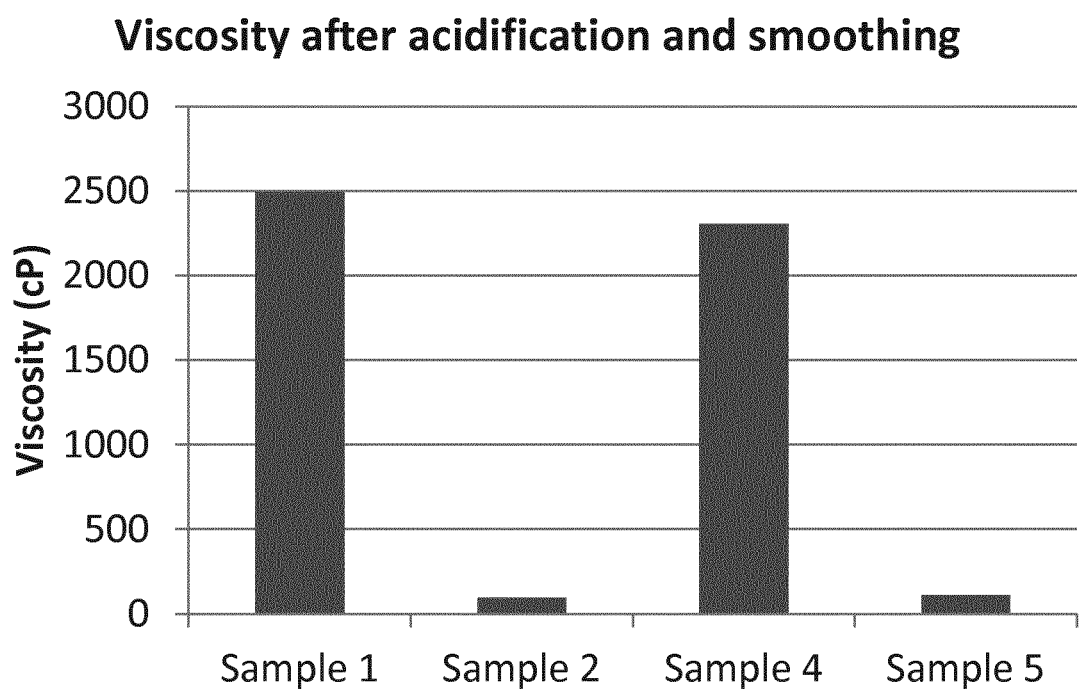
FIG. 3 shows the measured viscosities of four final whey protein-based yoghurts.

The acidification and the subsequent smoothing changed the viscosities dramatically. The viscosities of the final yoghurt products were measured according to Example 1.3 and the results have been reproduced in FIG. 3. The final yoghurts of samples 1 and 4 both had nicely set gel yet they were still soft and spoonable, and they have a pleasant creamy taste and a shiny and smooth visual appearance. No traces of syneresis or sedimentation of particles were observed.

The final yoghurts of samples 2 and 5, on the other hand, had a surprisingly low viscosity and were clearly unfit for stirred-type or set-type yoghurt products. The yoghurts of samples 2 and 5 furthermore appeared to be prone to particles sedimentation and syneresis.

The final yoghurt of sample 1 (heat-treated at 80 degrees C.) furthermore appeared to be slightly better quality than that of sample 4 (heat-treated at 90 degrees C.). This indicates that a reduced temperature during heat-treatment of the premix of whey protein-based, yoghurt-like products gives rise to improved whey protein-based yoghurt products (incl. a more shiny and even visual appearance and a more smooth and creamy taste) if the combination of type A particles and type B particles are used.

The inventors therefore conclude that the combination of type A particles and type B particles provides both significant advantages during the processing of high protein, whey-based yoghurts (a lower degree of gel-formation during the heat-treatment allows for longer processing cycles between the cleaning cycles and a lower viscosity of the heat-treated premix means easier subsequent processing) and an improved final yoghurt product (higher viscosity, smooth and creamy taste and no detectable sedimentation or syneresis).

Example 3: Production of a Heat-Treated Whey Protein-Based, High Protein Yoghurt Product A sucrose-containing variant of sample 4 of Example 2 was prepared using the same ingredients as in Example 2 and a similar process. The ingredients were used in the following amounts:

| Water | 77.2% (w/w) |
|---|---|
| Cream, 38% fat | 2.0% (w/w) |
| Source of Type A particles | 9.1% (w/w) |
| Source of type B particles | 3.5% (w/w) |
| Sucrose (white) | 7.0% (w/w) |
| Whey permeate powder | 1.2% (w/w) |

Prior to the packaging step, the yoghurt product was pasteurized at 75 degrees C. for 30 seconds in order to increase the shelf life of the yoghurt product, homogenized at 180 bar (also at 75 degrees C.), and packaged by warm-filling. The packaged yoghurt-like product was stored at 5 degrees C.

Results and Conclusion:

The heat-treated yoghurt-like product was evaluated at day 6 after production, after 3 months and after 9 months.

At day 6 the yoghurt-like product was found to be nice and shiny and to have a good taste. No syneresis could be detected.

Figure 4:
FIG. 4 shows a photo of a heat-treated yoghurt-like product after 9 months storage.

After both 3 and 9 months, the taste and the visual appearance were found to be good and no syneresis was detected. A photography of the yoghurt products tested after 9 months of storage is shown in FIG. 4.

These observation are in line with other trials performed by the inventors demonstrating a good heat-stability of acidified dairy products based on the combination of type A and type B particles.

The inventors conclude that the combination of type A particles and type B particles are very well-suited for producing heat-treated yoghurt-like product having a long shelf-life.

The invention claimed is:

1. A whey protein-based dairy product comprising:
a total content of protein of at least 7% (w/w), and
a combination of:
insoluble whey protein particles having a particle size in the range of 1-10 micron (referred to as type A particles) in an amount of at least 20% (w/w) relative to the total amount of protein
acid-gellable whey protein aggregates having a particle size in the range of 0.02-0.5 micron (referred to as type B particles) in an amount of at least 10% (w/w) relative to the total amount of protein, and wherein at least 90% (w/w) of the protein is whey protein.

2. The whey protein-based dairy product of claim 1, wherein the product is a yogurt-like product.

3. The yoghurt-like product according to claim 2, wherein the yoghurt-like product is a stirred-type yoghurt-like product or a set-type yoghurt-like product.

4. The yoghurt-like product according to claim 2, wherein the whey protein-based yoghurt-like product is a heat-treated whey protein-based yoghurt-like product.

5. The yoghurt-like product according to claim 2, wherein the yoghurt-like product is characterized by at least one or all of: a high viscosity; a reduced tendency or low degree of particle sedimentation; a reduced tendency or low degree of syneresis; a pleasant creamy taste; and a shiny and smooth visual appearance.

6. A method of producing an acidified dairy product, comprising combining insoluble whey protein particles having a particle size in the range of 1-10 micron (referred to as type A particles) and acid-gellable whey protein aggregates having a particle size in the range of 0.02-0.5 micron (referred to as type B particles).

7. A method according to claim 6, wherein the type A particles are used in an amount of at least 20% (w/w) relative to the total amount of protein of the acidified dairy product, and the type B particles are used in an amount of at least 10% (w/w) relative to the total amount of protein of the acidified dairy product.

8. A method according to claim 6, wherein the acidified dairy product has a total protein content of at least 7% (w/w).

* * * * *